(12) United States Patent
Jeyasekaran et al.

(10) Patent No.: US 10,225,175 B2
(45) Date of Patent: Mar. 5, 2019

(54) SYSTEMS AND METHODS FOR DETERMINING A DEFAULT GATEWAY WITHOUT AN ENDPOINT CONFIGURATION

(71) Applicant: Cisco Technology, Inc., San Jose, CA (US)

(72) Inventors: Japson Jeyasekaran, San Jose, CA (US); Kiran Yedavalli, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 35 days.

(21) Appl. No.: 15/446,421

(22) Filed: Mar. 1, 2017

(65) Prior Publication Data

US 2018/0123944 A1 May 3, 2018

Related U.S. Application Data

(60) Provisional application No. 62/414,629, filed on Oct. 28, 2016.

(51) Int. Cl.
| | |
|---|---|
| *H04L 12/26* | (2006.01) |
| *H04W 88/16* | (2009.01) |
| *H04L 12/759* | (2013.01) |

(52) U.S. Cl.
CPC ............ *H04L 45/028* (2013.01); *H04L 43/10* (2013.01); *H04W 88/16* (2013.01)

(58) Field of Classification Search
CPC ..... H04L 12/467; H04L 41/20; H04L 45/028; H04L 69/324; H04L 69/325; H04W 88/16
See application file for complete search history.

(56) References Cited

U.S. PATENT DOCUMENTS

| | | | | |
|---|---|---|---|---|
| 6,898,183 | B1* | 5/2005 | Garakani | H04L 41/12 370/230 |
| 6,944,130 | B1* | 9/2005 | Chu | H04L 12/462 370/238.1 |
| 2005/0099948 | A1* | 5/2005 | Wakumoto | H04L 43/50 370/236 |
| 2008/0310326 | A1* | 12/2008 | Shaw | H04L 12/4633 370/254 |
| 2012/0290719 | A1* | 11/2012 | Lee | H04L 12/4641 709/224 |
| 2014/0153443 | A1* | 6/2014 | Carter | H04L 45/48 370/256 |

(Continued)

*Primary Examiner* — Kashif Siddiqui
(74) *Attorney, Agent, or Firm* — Polsinelli PC

(57) ABSTRACT

Disclosed are system, methods, and non-transitory computer readable media for accurately calculating a default gateway of an endpoint without probing the endpoint for the configured values to determine the path between network elements. Tracing the path of a flow in a network and displaying that on a user interface is extremely useful for network troubleshooting purposes. In order to find the gateway the flow would take out of the L2 domain, the endpoint's L2 default gateway is required. Usually the L2 gateway for network endpoints is configured on the endpoints themselves and this information cannot be accessed by network controllers (e.g., APIC-EM) directly. In such cases APIC-EM needs to determine the L2 gateway based on the information available to it from the network elements, instead of the endpoints themselves.

20 Claims, 4 Drawing Sheets

(56) References Cited

U.S. PATENT DOCUMENTS

| | | | | |
|---|---|---|---|---|
| 2014/0317279 A1* | 10/2014 | Roper | ............... | H04L 45/70 |
| | | | | 709/224 |
| 2015/0016286 A1* | 1/2015 | Ganichev | ............ | H04L 12/4633 |
| | | | | 370/252 |
| 2015/0281076 A1* | 10/2015 | Zhang | ............... | H04L 45/64 |
| | | | | 370/392 |
| 2016/0157043 A1* | 6/2016 | Li | ............... | H04W 4/70 |
| | | | | 370/254 |
| 2017/0149646 A1* | 5/2017 | Subhedar | ............... | H04L 45/02 |

* cited by examiner

SYSTEMS AND METHODS FOR DETERMINING A DEFAULT GATEWAY WITHOUT AN ENDPOINT CONFIGURATION

CROSS-REFERENCE TO RELATED APPLICATIONS

This application claims priority to U.S. provisional patent application Ser. No. 62/414,629, filed Oct. 28, 2016, entitled "Systems and Methods for Determining a Default Gateway without an Endpoint Configuration," which is hereby incorporated herein by reference in its entirety.

FIELD OF TECHNOLOGY

The present technology pertains to tracing a path between two points in a network topology, and more specifically pertains to determining a default gateway along two points in a network topology without accessing an endpoint.

BACKGROUND

Software-defined networking (SDN) enables network administrators to manage network services through abstraction of lower-level functionality. Cisco Application Policy Infrastructure Controller Enterprise Module (APIC-EM) is one such SDN solution for enterprise networks, wide area networks (WAN), access networks, etc. APIC-EM is configured to store network information in a network information policy database. One service of APIC-EM is path trace, which can compute the path between two endpoints in the network. Path trace significantly reduces the operating expense (apex) for customers for network troubleshooting. The current state of the art in this area is to use unreliable tools such as trace route and work with insufficient information and spend significant time and effort to determine the right path a 5-tuple flow would take in the network. Path trace on APIC-EM uses the collected data from the network and significantly reduces the time and effort to determine the right path a flow would take in the network. In most cases, it can even eliminate the apex the customer would have to bear to determine accurate paths. One important aspect in computing a path between two endpoints in the network is computing the Layer 2 default gateway for the endpoints. The Layer 2 default gateway is usually configured on the endpoints. Probing the endpoints for gathering the configured default gateway does not scale in certain networks, including enterprise networks, wide area networks (WAN), access networks.

SUMMARY

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

Disclosed are systems, methods and non-transitory computer readable mediums for determining a path between two networks elements by determined the Layer 2 default gateway. The systems, methods and non-transitory computer readable mediums can include receiving at least a source IP address and a destination IP address and traversing (e.g., using a depth-first search or a breadth first search algorithm, etc.) a Layer 2 forwarding domain, the Layer 2 forwarding domain comprises information of one or more network elements. For each network element traversed, the systems, methods and non-transitory computer readable mediums can determine whether the network element is a candidate gateway, and in response to the network element being a candidate gateway, can determine the candidate gateway is an actual gateway. Based on the actual gateway, the systems, methods, and non-transitory computer readable medium can determine a path between the source IP address and the destination IP address based on the actual gateway and display the determined path.

The systems, methods and non-transitory computer readable mediums can also include receiving a source L4 port number, destination L4 port number, and a transport protocol.

The systems, methods and non-transitory computer readable mediums can also determine an actual gateway when (1) the candidate gateway is an active router for a Virtual Local Area Network (VLAN) of the source IP address or the destination IP address; (2) the candidate gateway is directly connected to a source L3 (layer 3) network; or (3) the candidate gateway is not directly connected to a destination L3 network on the same egress and the candidate gateway is connected via another L3 interface (and can have active data forwarding interface for source data VLAN in case of redundancy).

BRIEF DESCRIPTION OF DRAWINGS

The above-recited and other advantages and features of the present technology will become apparent by reference to specific implementations illustrated in the appended drawings. A person of ordinary skill in the art will understand that these drawings only show some examples of the present technology and would not limit the scope of the present technology to these examples. Furthermore, the skilled artisan will appreciate the principles of the present technology as described and explained with additional specificity and detail through the use of the accompanying drawings in which.

DETAILED DESCRIPTION

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

One of the important parts in computing the path between two endpoints in the network is computing the Layer 2 gateway for the endpoints. Disclosed are system, methods, and non-transitory computer readable mediums for accurately calculating the default gateway of an endpoint without probing the endpoint for the configured values to determine the path between network elements. This becomes an even bigger challenge for legacy networks that do not have layer 3 access. The Layer 2 Default Gateway is usually configured on the endpoints. Probing the endpoints just for gathering their configured default gateway would be a challenge at scale in addition to raising security issues and in most cases it would not be possible to login into the endpoints.

Tracing the path of a flow in a network and displaying that on a user interface is extremely useful for network troubleshooting purposes. In order to find the gateway the flow would take out of the L2 (layer 2) domain, the endpoint's L2 default gateway is required. Usually the L2 gateway for network endpoints is configured on the endpoints themselves and this information cannot be accessed by network controllers (e.g., APIC-EM) directly. In such cases APIC-EM needs to determine the L2 gateway based on the information available to it from the network elements, instead of the endpoints themselves. Disclosed are systems, methods and non-transitory computer readable mediums for determining the L2 default gateway for endpoints by looking at the network information and not accessing the configuration within the endpoints.

Figure 1:
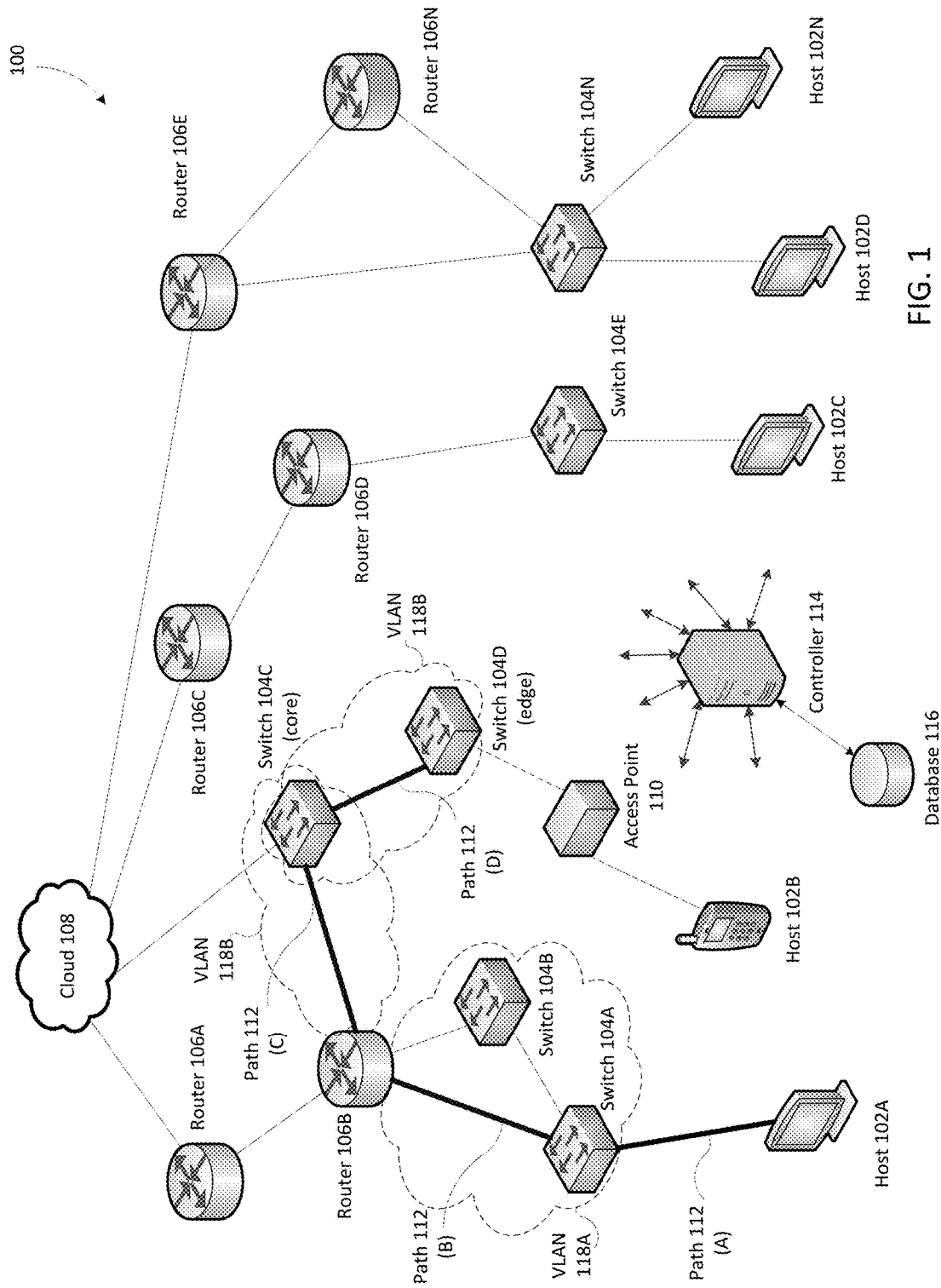
FIG. 1 shows an example path through an example network environment.

FIG. 1 shows an example path through network environment 200. Example network environment 100 can include a collection of network elements and networks including, but not limited to: wide area networks (WAN), local area networks (LAN), wireless networks, multiple protocol label switching (MLPS), virtual network, VLAN, equal cost multipath routing (ECMP), etc. Example network environment 100 can include a number of network elements including, but not limited to: wired or wireless host or node devices 102A, 102B, 102C, 102D, . . . , 102N (collectively "102"); switches 104A, 104B, 104C, . . . , 104N (collectively "104"); routers 106A, 106B, 106C, . . . , 106N (collectively "106"); one or more VLANs 118A and 118B, one or more clouds 108, and one or more access points 110. The network elements can be communicatively coupled (directly or indirectly) through a variety of network communications as described above. In some examples, network environment 100 can include a controller 114 (e.g., APIC-EM). Controller 114 can be configured to manage and control the network elements through one or more policies. Controller 114 can be communicatively coupled (directly or indirectly) to the network elements as shown by the multi-arrows corning to and from controller 114. Controller 114 can further be configured to store network information in a network information policy database 116. For example, the controller can be configured receive and store (at the database) MAC addresses, IP address, connected interfaces, VLAN on the interface, etc. It will be appreciated that many other network elements may be provided and that the elements shown in FIG. 1 are merely by way of example.

Example path 112 can include one or more segments (A, B, C, D, etc.) between network elements. In the example shown in FIG. 1, the example path is between host 102A and edge switch 104D. In some examples, the path can be between two network elements. In other examples, the path can be between a network element and a network (as shown in FIG. 1). Edge switch 104D is communicatively coupled to access point 110 (which can be communicatively coupled to another network environment). In some examples, a segment of the path can include more than one route. For example, path 112 (D) between Switch 104D and switch 104C can be an ECMP network with two or more links. When determining the example path, one of the two or more links can be selected for the path.

Figure 2:
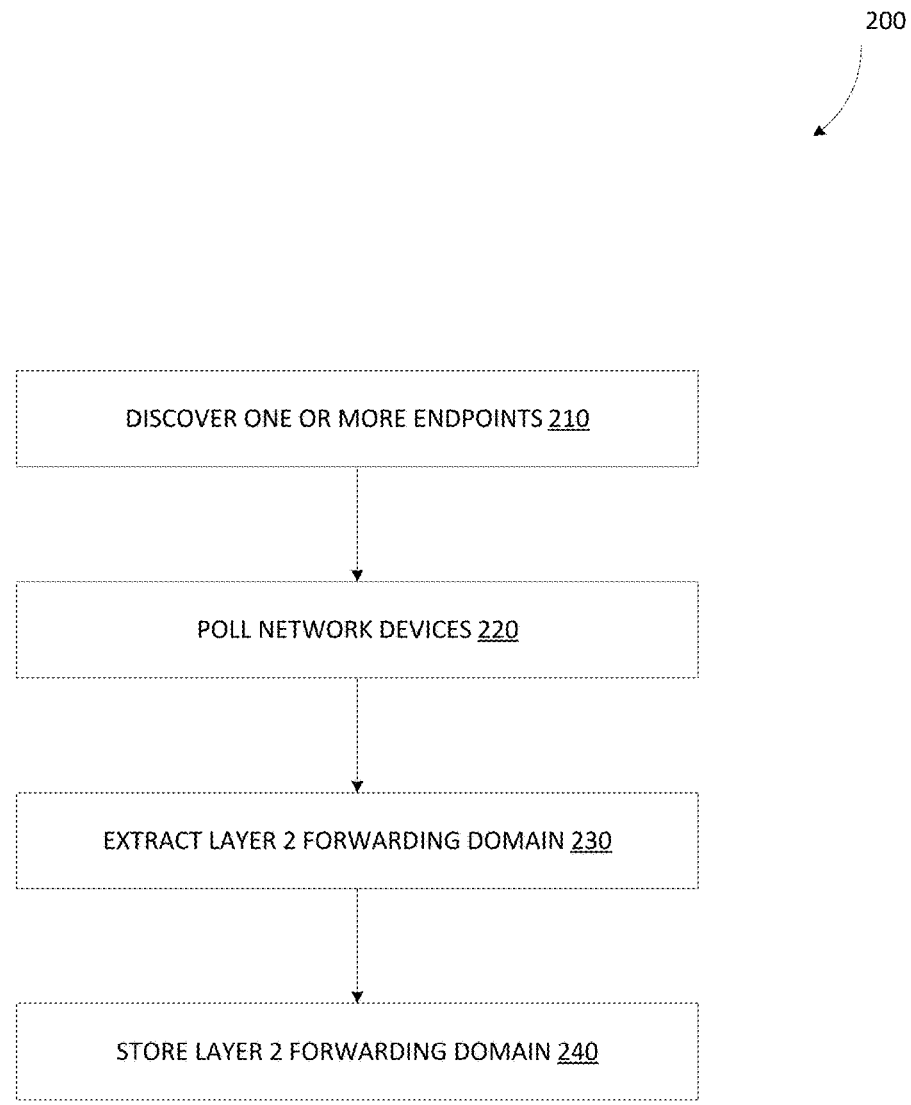
FIG. 2 shows a flow diagram of an example method for generating a forwarding domain.
Figure 3:
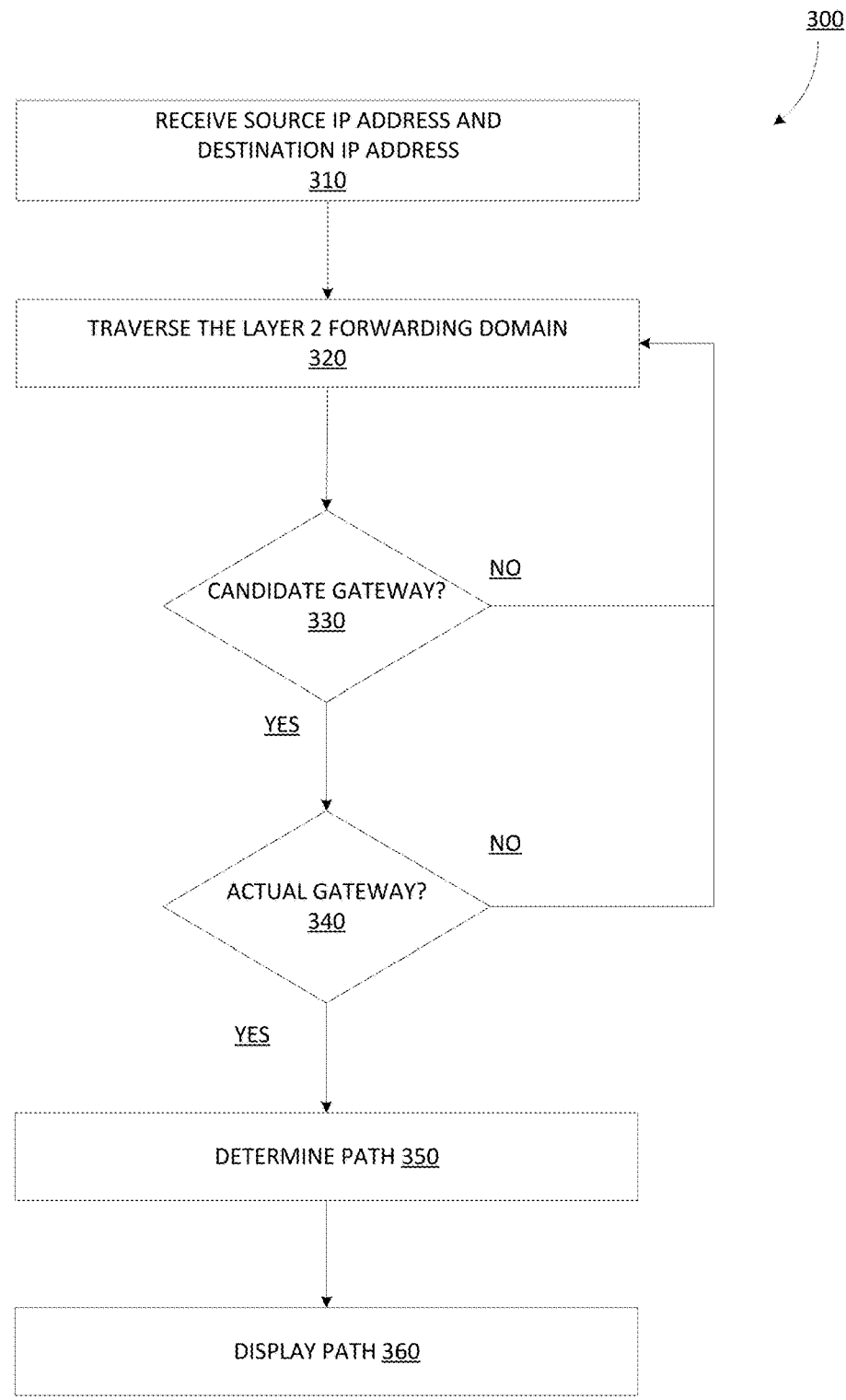
FIG. 3 shows a flow diagram of an example method for determining a default gateway.

Example path 112 can be determined from methods 200 and 300 as shown in FIG. 2 and FIG. 3. It will be appreciated that paths can be determined between any of the network elements provided in the network environment and that the path shown in FIG. 1 is merely by way of example.

The method shown in FIG. 2 is provided by way of example, as there are a variety of ways to carry out the method. Additionally, while the example method is illustrated with a particular order of sequences, those of ordinary skill in the art will appreciate that FIG. 2 and the sequences shown therein can be executed in any order that accomplishes the technical advantages of the present disclosure and can include fewer or more sequences than illustrated.

Each sequence shown in FIG. 2 represents one or more processes, methods or subroutines, carried out in the example method. The sequences shown in FIG. 2 can be implemented in a network environment such as network environment 100 shown in FIG. 1. The flow chart illustrated in FIG. 2 will be described in relation to and make reference to at least the elements of system 100 shown in FIG. 1.

FIG. 2 shows a flow diagram of an example method 200 for generating a forwarding domain. Method 200 can begin at sequence 210. At sequence 210, one or more endpoints can be discovered. For example, network elements (e.g., switches 104) can discover one or more endpoints (e.g., hosts 102). In some examples, the endpoints can utilize dynamic host configuration protocol (DHCP) snooping (e.g., to prevent unauthorized DHCP servers offering IP addresses). In other examples, the endpoints can utilize address resolution protocol (ARP) snooping. In other examples, endpoints can be discovered through associations for wireless network elements.

Based on the type of network device different information can be gathered from network endpoints. For example, based on the type of network device, sequence 210 can gather information about network endpoints attached using network devices. The information collected can include the type of client (e.g., wired, wireless, both, etc.), data VLAN for the client (e.g., access VLAN, voice VLAN, etc.), client L2 reachability information (e.g., connected interface, access points in case of wireless clients, etc.), client L3 reachability information (IPv4 address, IPV6 Address, etc.), L2 network configuration (port-forwarding information, topology link status, etc.) and L3 network configuration (IPV4 address, IPV6 address, subnet mask, etc.).

In the example shown in FIG. 1, the example path 112 is between host 102A and edge switch 104D. Host 102A can be a wired client connected to switch 104A and data VLAN 118A and switch 104D can be in data VLAN 118B. Host 102A can be discovered by controller 114 when switch 104A is discovered by controller 114. For example, as part of switch 104A controller 114 can exact the data about host 102A and store the extracted information in database 116. The data extraction protocol used can vary based on device type, however data persisted or represented can be abstracted (e.g., discovered) regardless of the device types. For example, controller 114 can acquire endpoint information (e.g., as described above, by periodically polling network elements, etc.) from switch 104A through notifications by the network elements (e.g., simple network management protocol traps, etc.) or executing commands (via controller 114) using an available management interface.

At sequence 220, one or more network elements can be polled. In some examples, network elements can be polled at regular intervals (e.g., to keep database 116 up-to-date). In some examples, client device statuses can also be monitored. In some examples, a client attachment interface to the network can be changed or updated (e.g., when wireless clients roam the network attachment point (Wireless Access Points) would change). For example, controller 114 can periodically poll switch 104A to gather client end point information (e.g., client, data VLAN for the client, client L2 reachability information, client L3 reachability information, client status, L2 network configuration, L3 network configuration, etc.). When a client device's data VLAN changes, the information can be updated in database 116.

At sequence 230, a Layer 2 forwarding domain for the endpoints can be extracted. For example, the received source and destination endpoint information can be used to carve out a Layer 2 forwarding domain. The source and destination can be on the same (or different) forwarding domains. As shown in FIG. 1, source host 102A is in VLAN 118A and destination switch 104D is in VLAN 118B. Accordingly, host 102A and switch 104D are in different layer 2 forwarding domains. The data VLANs can be used to identify L2 forwarding domains.

Layer 2 network technology and VLAN for the endpoint enabled on the network can be used to determine the Layer 2 forwarding domain. For example, the Layer 2 forwarding domain can be based on spanning tree protocol (STP), rapid spanning tree protocol (RSTP), resilient Ethernet protocol (REP), virtual local area network (VLAN) trunking or switch port configuration. The Layer 2 forwarding domain can provided a holistic view of the network elements participating in the Layer 2 forwarding domain (for a given VLAN) and network elements that could be candidate gateways. As shown in FIG. 1, the extracted Layer 2 forwarding domain for data VLAN 118A can include switch 104A, switch 104B, router 106B.

At sequence 240, the Layer 2 forwarding domain can be stored. For example, controller 114 can store the Layer 2 forwarding domain at database 116.

The method shown in FIG. 3 is provided by way of example, as there are a variety of ways to carry out the method. Additionally, while the example method is illustrated with a particular order of sequences, those of ordinary skill in the art will appreciate that FIG. 3 and the sequences shown therein can be executed in any order that accomplishes the technical advantages of the present disclosure and can include fewer or more sequences than illustrated.

Each sequence shown in FIG. 3 represents one or more processes, methods or subroutines, carried out in the example method. The sequences shown in FIG. 3 can be implemented in a network environment such as network environment 100 shown in FIG. 1. The flow chart illustrated in FIG. 3 will be described in relation to and make reference to at least the elements of system 100 shown in FIG. 1.

FIG. 3 shows a flow diagram of an example method 300 for determining a default gateway and path between two network elements. Method 300 can begin at sequence 310. At sequence 310, the controller can receive at least a source IP address and a destination IP address. For example, a user (e.g., network administrator) may want to trace the path of a flow in a network and display the path on a user interface (as shown in FIG. 1). The path can be extremely useful for troubleshooting purposes (e.g., packet loss from a source to a destination). In some examples, a user can enter a source IP address (e.g., IP address of Host 102A) and a destination IP address (e.g., IP address of edge switch 104D) in the user interface. In some examples, the destination IP address can be another network element or a network (e.g., switch, access point, etc.). In some examples, a 5-tuple input can be received as input (e.g., source IP address, destination IP address, source L4 port, destination L4 port and the protocol). In some examples, the minimum requirement for a path trace is the source IP address and destination IP address.

At sequence 320, the Layer 2 forwarding domain is traversed. The Layer 2 forwarding domain can be stored in database 116. For example, the Layer 2 forwarding domain can be traversed to determine one or more candidate gateways. In some examples, the Layer 2 forwarding domain can be traversed using a depth-first search or breadth first search algorithm to determine candidate gateways. At sequence 330 (and for each entry in the Layer 2 forwarding domain traversed) a determination can be made on whether the entry is a candidate gateway. When the entry is not a candidate gateway, the traverse of the Layer 2 forwarding domain can continue at sequence 320. When the entry is a candidate gateway, method 300 can proceed to sequence 340.

In some examples, a device can be a candidate gateway when the device is directly connected (e.g., communicatively coupled) to a source L3 network. For example, router 106B is directly connected to source L3 network (e.g., VLAN 118A) and the route to the destination is on a different L3 interface (e.g., VLAN 118B). In other examples, the device can be a candidate gateway when a destination L3 network is not directly connected on the same egress interface but connected by another L3 interface (and can have active data forwarding interface for source data VLAN in case of redundancy). When the entry is not an actual gateway, the traverse of the Layer 2 forwarding domain can continue at sequence 320. When the entry is an actual gateway, method 300 can proceed to sequence 350.

At sequence 340, a determination can be made as to whether the candidate gateway is an actual gateway. In some examples, the candidate gateway can be an actual gateway when the candidate gateway is an active router (e.g., virtual router redundancy protocol (VRRP), hot standby router protocol (HSRP), gateway load balancing protocol (GLBP), etc.) for the endpoint's VLAN. When the entry is an actual gateway, method 300 can proceed to sequence 350. At sequence 350, the path can be determined based on the actual gateway.

At sequence 360, the path can be displayed at the user interface. For example, the path between the source IP and destination IP address can be displayed (e.g., path 112 between host 102A and edge switch 104D, as shown in FIG. 1).

Figure 4:
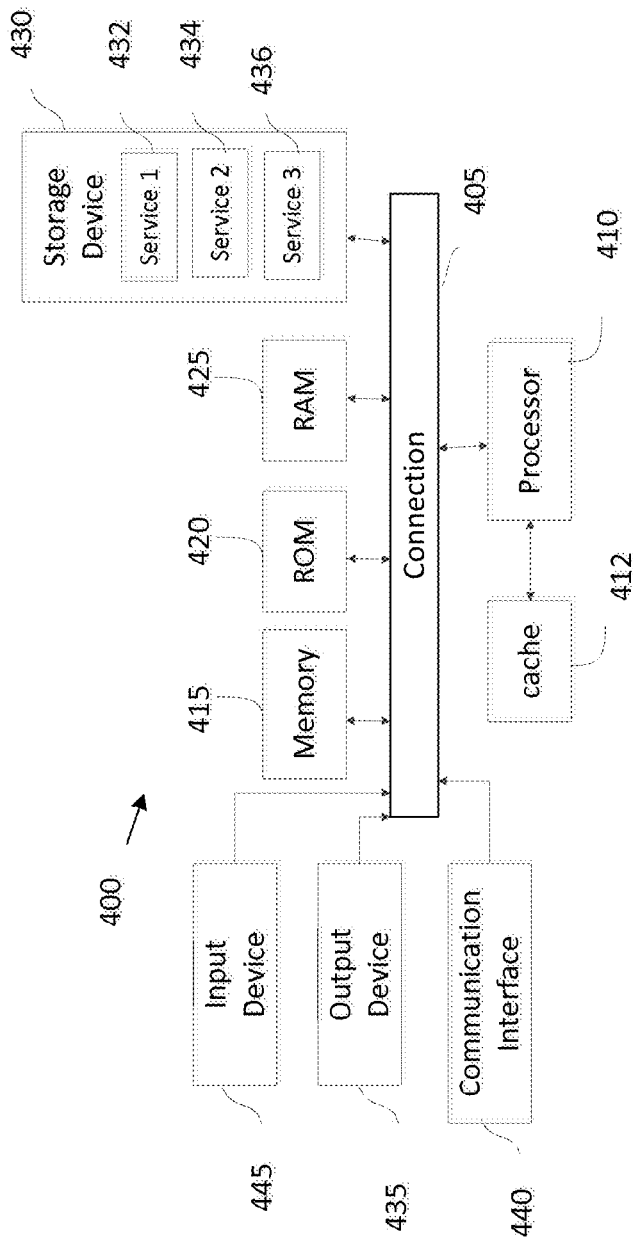
FIG. 4 shows an example of a system for implementing certain aspects of the present technology.

FIG. 4 shows an example of computing system 400 in which the components of the system are in communication with each other using connection 405. Connection 405 can be a physical connection via a bus, or a direct connection into processor 410, such as in a chipset architecture. Connection 405 can also be a virtual connection, networked connection, or logical connection.

In some embodiments computing system 400 is a distributed system in which the functions described in this disclosure can be distributed within a datacenter, multiple datacenters, a peer network, etc. In some embodiments, one or more of the described system components represents many such components each performing some or all of the function for which the component is described. In some embodiments, the components can be physical or virtual devices.

Example system 400 includes at least one processing unit (CPU or processor) 410 and connection 405 that couples various system components including system memory 415, such as read only memory (ROM) and random access memory (RAM) to processor 410. Computing system 400 can include a cache of high-speed memory connected directly with, in close proximity to, or integrated as part of processor 410.

Processor 410 can include any general purpose processor and a hardware service or software service, such as services 432, 434, and 436 stored in storage device 430, configured to control processor 410 as well as a special-purpose processor where software instructions are incorporated into the actual processor design. Processor 410 may essentially be a completely self-contained computing system, containing multiple cores or processors, a bus, memory controller, cache, etc. A multi-core processor may be symmetric or asymmetric.

To enable user interaction, computing system 400 includes an input device 445, which can represent any number of input mechanisms, such as a microphone for speech, a touch-sensitive screen for gesture or graphical input, keyboard, mouse, motion input, speech, etc. Computing system 400 can also include output device 435, which can be one or more of a number of output mechanisms known to those of skill in the art. In some instances, multimodal systems can enable a user to provide multiple types of input/output to communicate with computing system 400. Computing system 400 can include communications interface 440, which can generally govern and manage the user input and system output. There is no restriction on operating on any particular hardware arrangement and therefore the basic features here may easily be substituted for improved hardware or firmware arrangements as they are developed.

Storage device 430 can be a non-volatile memory device and can be a hard disk or other types of computer readable media which can store data that are accessible by a computer, such as magnetic cassettes, flash memory cards, solid state memory devices, digital versatile disks, cartridges, random access memories (RAMs), read only memory (ROM), and/or some combination of these devices.

The storage device 430 can include software services, servers, services, etc., that when the code that defines such software is executed by the processor 410, it causes the system to perform a function. In some embodiments, a hardware service that performs a particular function can include the software component stored in a computer-readable medium in connection with the necessary hardware components, such as processor 410, connection 405, output device 435, etc., to carry out the function.

For clarity of explanation, in some instances the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software services or services, alone or in combination with other devices. In some embodiments, a service can be software that resides in memory of a client device and/or one or more servers of a content management system and perform one or more functions when a processor executes the software associated with the service. In some embodiments, a service is a program, or a collection of programs that carry out a specific function. In some embodiments, a service can be considered a server. The memory can be a non-transitory computer-readable medium.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, solid state memory devices, flash memory, USB devices provided with non-volatile memory, networked storage devices, and so on.

Devices implementing methods according to these disclosures can comprise hardware, firmware and/or software, and can take any of a variety of form factors. Typical examples of such form factors include servers, laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

We claim:

1. A method comprising:
   receiving, at a controller, at least a source IP address and a destination IP address;
   traversing, by the controller, a Layer 2 forwarding domain, where the Layer 2 forwarding domain comprises information of one or more network elements;
   for each network element traversed, determining whether the network element is a candidate gateway;
   in response to the network element being a candidate gateway,
   determining the candidate gateway is an actual gateway;
   determining a path between the source IP address and the destination IP address based on the actual gateway; and
   displaying, by the controller, the path.

2. The method of claim 1, further comprising:
receiving, at the controller, a source L4 port number, destination L4 port number, and a transport protocol.

3. The method of claim 1, wherein the candidate gateway is the actual gateway when the candidate gateway is an active router for a VLAN of the source IP address or the destination IP address.

4. The method of claim 1, wherein the network element is the candidate gateway when the network element is directly connected to a source L3 network.

5. The method of claim 1, wherein the network element is the candidate gateway when the network element is not directly connected to a destination L3 network on the same egress.

6. The method of claim 5, wherein the network element is the candidate gateway when the network element is connected via another L3 interface and has active data forwarding interface for source data VLAN in case of redundancy.

7. The method of claim 1, wherein the Layer 2 forwarding domain is traversed using a depth-first search or a breadth first search algorithm.

8. A controller comprising:
a processor;
a network interface; and
a memory comprising instructions, which when executed by the processor cause the processor to:
receive, at the network interface, at least a source IP address and a destination IP address;
traverse a Layer 2 forwarding domain, where the Layer 2 forwarding domain comprises information of one or more network elements;
for each network element traversed, determine whether the network element is a candidate gateway;
in response to the network element being a candidate gateway, determine the candidate gateway is an actual gateway;
determine a path between the source IP address and the destination IP address based on the actual gateway; and
display the path.

9. The controller of claim 8, further comprising instructions which when executed cause the processor to:
receive a source L4 port number, destination L4 port number, and a transport protocol.

10. The controller of claim 8, wherein the candidate gateway when the candidate gateway is an active router for a VLAN of the source IP address or the destination IP address.

11. The controller of claim 8, wherein network element is the candidate gateway when the network element is directly connected to a source L3 network.

12. The controller of claim 8, wherein the network element is the candidate gateway when the network element is not directly connected to a destination L3 network on the same egress.

13. The controller of claim 12, wherein network element is the candidate gateway when network element is connected via another L3 interface and has active data forwarding interface for source data VLAN in case of redundancy.

14. The controller of claim 8, wherein the Layer 2 forwarding domain is traversed using a depth-first search or a breadth first search algorithm.

15. A non-transitory computer-readable medium comprising instructions, which when executed by a processor cause the processor to:
receive, at least a source IP address and a destination IP address;
traverse a Layer 2 forwarding domain, where the Layer 2 forwarding domain comprises information of one or more network elements;
for each network element traversed, determine whether the network element is a candidate gateway;
in response to the network element being a candidate gateway, determine the candidate gateway is an actual gateway;
determine a path between the source IP address and the destination IP address based on the actual gateway; and display the path.

16. The non-transitory computer-readable medium of claim 15, further comprising instructions which when executed cause the processor to:
receive a source L4 port number, destination L4 port number, and a transport protocol.

17. The non-transitory computer-readable medium of claim 15, wherein the candidate gateway is the actual gateway when the candidate gateway is an active router for a VLAN of the source IP address or the destination IP address.

18. The non-transitory computer-readable medium of claim 15, wherein the network element is the candidate gateway when the network element is directly connected to a source L3 network.

19. The non-transitory computer-readable medium of claim 15, wherein the network element is the candidate gateway when the network element is not directly connected to a destination L3 network on the same egress.

20. The non-transitory computer-readable medium of claim 19, wherein the network element is the candidate gateway when the network element is connected via another L3 interface and has active data forwarding interface for source data VLAN in case of redundancy.

* * * * *